United States Patent
Hansen et al.

(10) Patent No.: US 10,867,193 B1
(45) Date of Patent: Dec. 15, 2020

(54) IMAGING SYSTEMS FOR FACIAL DETECTION, LICENSE PLATE READING, VEHICLE OVERVIEW AND VEHICLE MAKE, MODEL, AND COLOR DETECTION

(71) Applicant: Gatekeeper Security, Inc., Sterling, VA (US)

(72) Inventors: Marc Hansen, Hamilton, NJ (US); Jonathan Nazemi, Doylestown, PA (US); Robert Rozploch, Newtown, PA (US)

(73) Assignee: Gatekeeper Security, Inc., Sterling, VA (US)

( * ) Notice: Subject to any disclaimer, the term of this patent is extended or adjusted under 35 U.S.C. 154(b) by 0 days.

(21) Appl. No.: 16/507,918

(22) Filed: Jul. 10, 2019

(51) Int. Cl.
*G06K 9/00* (2006.01)
*H04N 5/235* (2006.01)
*H04N 5/247* (2006.01)
*G06K 9/32* (2006.01)

(52) U.S. Cl.
CPC ..... *G06K 9/00838* (2013.01); *G06K 9/00255* (2013.01); *G06K 9/3258* (2013.01); *H04N 5/2354* (2013.01); *H04N 5/247* (2013.01); *G06K 2209/15* (2013.01); *G06K 2209/23* (2013.01)

(58) Field of Classification Search
None
See application file for complete search history.

(56) References Cited

U.S. PATENT DOCUMENTS

| | | | |
|---|---|---|---|
| 6,650,765 B1 * | 11/2003 | Alves | G08G 1/0175 340/933 |
| 7,786,897 B2 | 8/2010 | Alves | |
| 8,005,267 B2 | 8/2011 | Chew | |
| 9,791,766 B2 | 10/2017 | Ekin | |
| 2002/0092988 A1 * | 7/2002 | Didomenico | G01N 21/3504 250/338.5 |
| 2003/0174865 A1 | 9/2003 | Vernon | |
| 2004/0225651 A1 * | 11/2004 | Musgrove | G06Q 30/0283 |
| 2008/0175438 A1 * | 7/2008 | Alves | G08G 1/0175 382/105 |
| 2008/0211914 A1 * | 9/2008 | Herrera | H04N 7/18 348/148 |
| 2008/0285803 A1 * | 11/2008 | Madsen | H04N 5/2256 382/105 |

(Continued)

FOREIGN PATENT DOCUMENTS

WO 2014/110629 A1 7/2014

*Primary Examiner* — Kaitlin A Retallick
(74) *Attorney, Agent, or Firm* — Locke Lord LLP; Joshua L. Jones

(57) ABSTRACT

A system includes a camera defining an optical axis and a field of view defined about the optical axis. An illuminator is mounted offset from the optical axis and directed to illuminate at least a portion of the field of view, wherein the illuminator is operatively connected to the camera to provide illumination during an image capturing exposure of the camera. An image processer is operatively connected to the camera and includes machine readable instructions configured to receive image data representative of an image captured with the camera, perform facial detection to detect at least one face in the image, perform license plate detection to detect at least one license plate in the image, and to provide a vehicle overview image.

19 Claims, 4 Drawing Sheets

(56) References Cited

U.S. PATENT DOCUMENTS

| | | | | |
|---|---|---|---|---|
| 2011/0182473 | A1* | 7/2011 | Wang | G06K 9/00785 |
| | | | | 382/103 |
| 2012/0069183 | A1* | 3/2012 | Aoki | G07B 15/063 |
| | | | | 348/148 |
| 2013/0243260 | A1 | 9/2013 | Burry et al. | |
| 2014/0002617 | A1* | 1/2014 | Zhang | G01N 15/1463 |
| | | | | 348/48 |
| 2014/0132501 | A1* | 5/2014 | Choi | G01B 11/2545 |
| | | | | 345/156 |
| 2014/0253701 | A1* | 9/2014 | Wexler | G09B 21/008 |
| | | | | 348/62 |
| 2014/0334684 | A1* | 11/2014 | Strimling | G06K 9/3258 |
| | | | | 382/105 |
| 2018/0306598 | A1* | 10/2018 | DeCia | G01C 21/3492 |
| 2018/0307915 | A1* | 10/2018 | Olson | G05D 1/0251 |

* cited by examiner

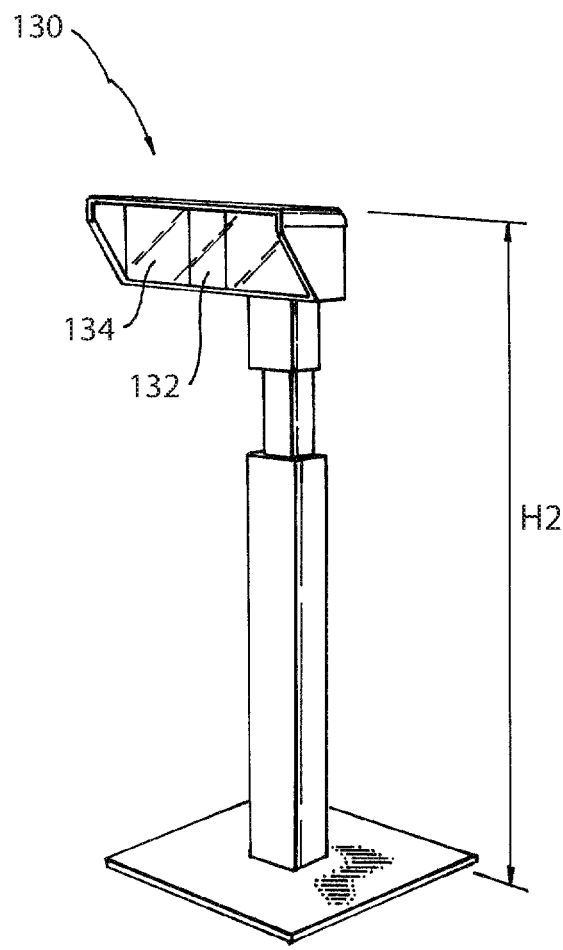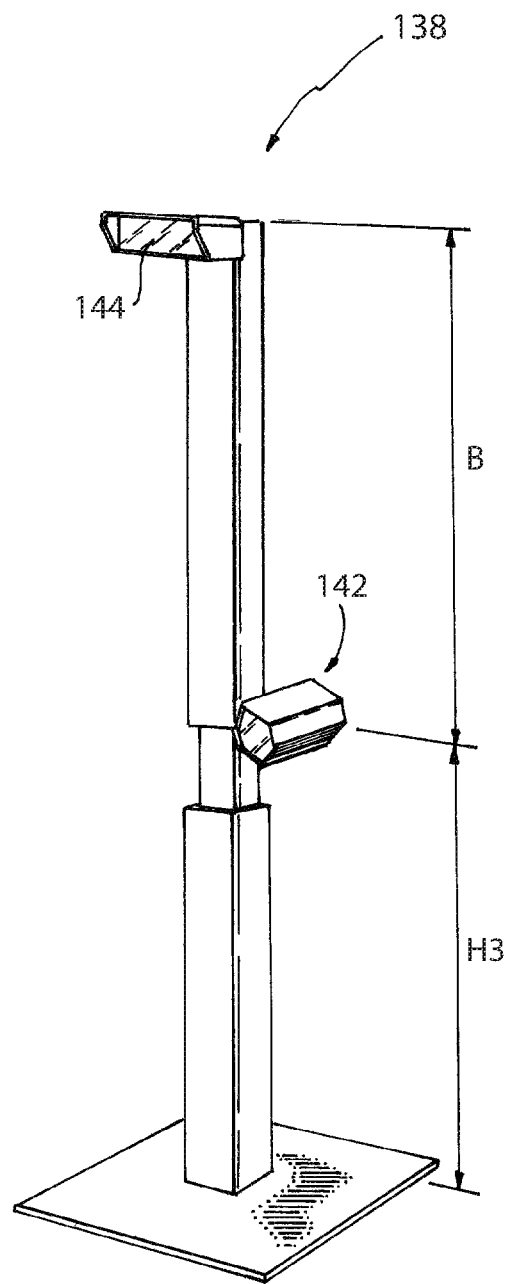
Fig. 3
Fig. 4

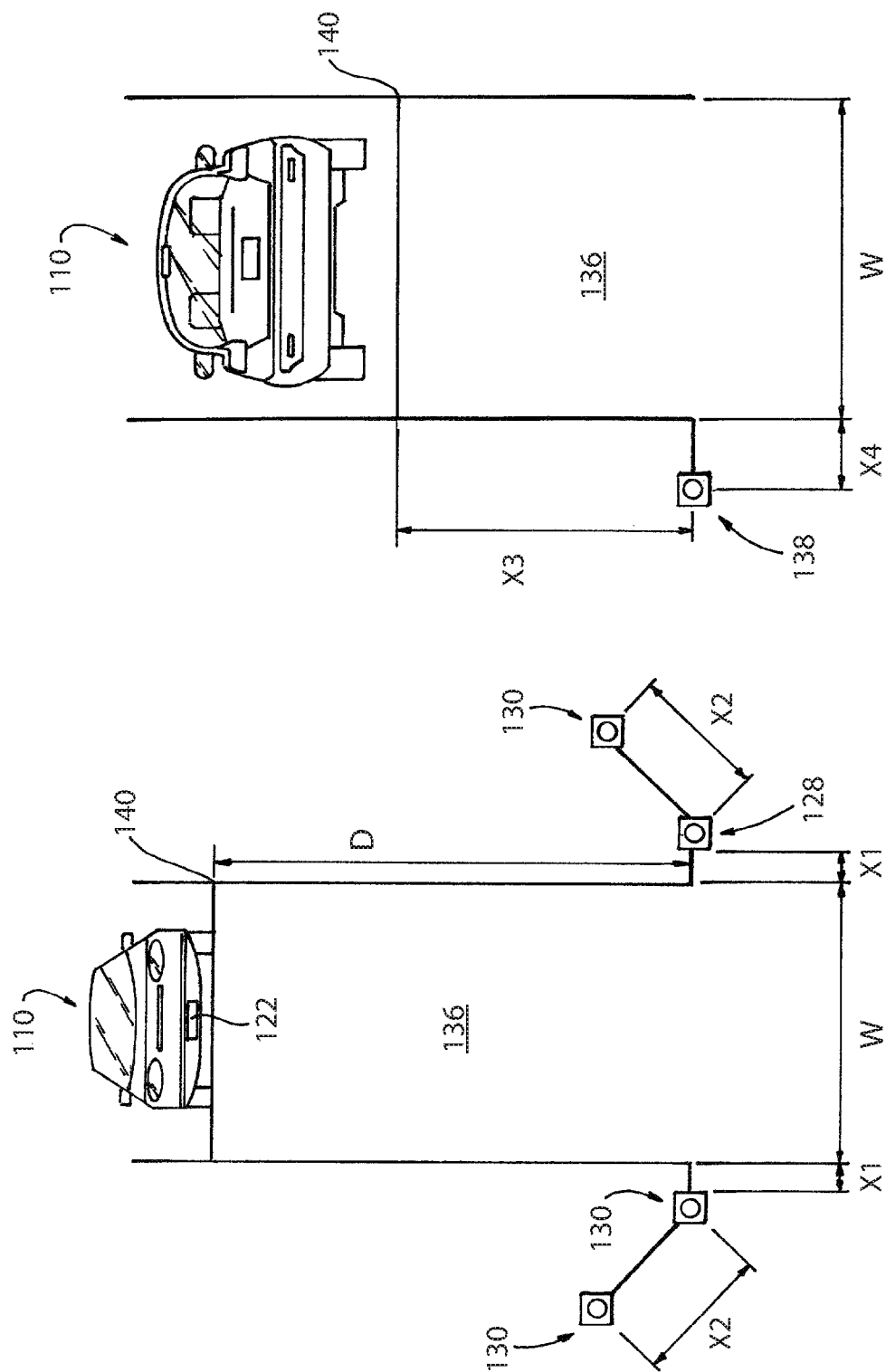

IMAGING SYSTEMS FOR FACIAL DETECTION, LICENSE PLATE READING, VEHICLE OVERVIEW AND VEHICLE MAKE, MODEL, AND COLOR DETECTION

BACKGROUND

1. Field

The present disclosure relates to facial detection, license plate reading, vehicle overview, and detection of vehicle make, model, and color.

2. Description of Related Art

At security check points, border crossings, high occupancy vehicle (HOV) lanes, and the like, it is desirable to detect faces inside a vehicle, detect and read the license plate of a vehicle, and to identify the make, model, and color of a vehicle. At a traditional checkpoint an officer can ascertain this type of information, including counting occupants in a vehicle. In security applications, it can be desirable to know who the occupants of a vehicle are. An officer can verify this by inspection of identification documents such as a photo ID for each occupant of the vehicle. However, these techniques require each vehicle to stop for inspection before passing through.

The conventional techniques have been considered satisfactory for their intended purpose. However, there is an ever present need for improved systems and methods for detecting, counting, and identifying occupants in vehicles. This disclosure provides a solution for this need.

SUMMARY

A system includes a camera defining an optical axis and a field of view defined about the optical axis. An illuminator is mounted offset from the optical axis and directed to illuminate at least a portion of the field of view, wherein the illuminator is operatively connected to the camera to provide illumination during an image capturing exposure of the camera. An image processer is operatively connected to the camera and includes machine readable instructions configured to receive image data representative of an image captured with the camera, perform facial detection to detect at least one face in the image, perform license plate detection/decoding for at least one license plate in the image, and to provide a vehicle overview image.

The machine readable instructions can be configured to output facial detection data for use in facial recognition, to perform license plate reading and to output at least one of a license plate number, region, state, country and/or color of license plate, and to identify make, model, color, year and/or type (class) of a vehicle detected in the image. The model name can be localized based on at least one of geography detected in license plate detection and/or geographical location of the camera. A global positioning sensor can be operatively connected to the image processer, wherein the machine readable instructions are configured to output model name based on location data from the global positioning sensor.

The camera can include optics optically coupled to a sensor, wherein the combined optics and sensor are configured to provide at least 5 megapixels of image data at 280 pixels per foot (30.5 cm). The optics and sensor can be configured to provide a field of view angle of 32.5° by 27.5° (width by height) for imaging vehicles at a distance of 15 feet (4.6 meters). The optics and sensor can be configured to provide a field of view angle of 24.5° by 20.5° (width by height) for imaging vehicles at a distance of 20 feet (6.1 meters). The sensor can be configured for sensitivity in at least one of visible and/or near infrared (NIR).

The illuminator can be separated from the optical axis by a standoff distance configured to avoid overexposure of retroreflective license plate paint. The standoff distance can be two feet (61 cm) and the optical axis can be angled to capture license plate images wherein the license plates are between 15 to 20 feet (4.6 meters to 6.1 meters), inclusive, away from the camera. The camera and illuminator can be configured to properly expose faces through vehicle glass, retroreflective license plates, and vehicle body features all in a single exposure regardless of whether the exposure occurs under noon-day sun or dark night conditions. The camera can be programmed to expose for image capture using an f/1.2 aperture setting, and a 200 microsecond shutter speed day or night. The illuminator can be configured to illuminate at 10° full width at half maximum (FWHM) to illuminate faces inside a vehicle with relatively intense illumination and at the same time illuminate retroreflective license plate of the vehicle with relatively less intense illumination.

The camera can be a first camera of a plurality of cameras, wherein the illuminator is a first illuminator of a plurality of illuminators, and wherein the image processor is configured to control timing of the cameras and illuminators so the first camera exposes for image capture only under illumination from the first illuminator. The first camera and the first illuminator can be mounted to a main pole positioned to face oncoming traffic. The plurality of cameras can include three side pole mounted cameras, one on a common side of a lane of the oncoming traffic with the main pole, and two on an opposite side of the lane. The plurality of cameras can include a rear camera, wherein the plurality of illuminators includes a rear illuminator, and wherein the rear camera and rear illuminator are mounted to a rear pole positioned on an opposite side of a ground loop trigger point from the main pole for imaging rear license plates.

The imaging processor can include a connectivity interface configured to allow remote activation and deactivation of facial detection services, license plate reading services, vehicle overview services, and/or vehicle make, model, and color services, e.g., without needing to change any camera hardware.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is a perspective view of another portion of the system of FIG. 1, showing a side pole for face detection;

FIG. 4 is a perspective view of another portion of the system of FIG. 1, showing a rear pole;

FIG. 5 is a schematic view of a portion of the system of FIG. 1, showing positions of the main pole and side poles relative to the grounded loop trigger point; and FIG. 6 is a schematic view of a portion of the system of FIG. 1, showing the position of the rear pole relative to the ground loop trigger point.

DETAILED DESCRIPTION OF THE PREFERRED EMBODIMENTS

Figure 1:
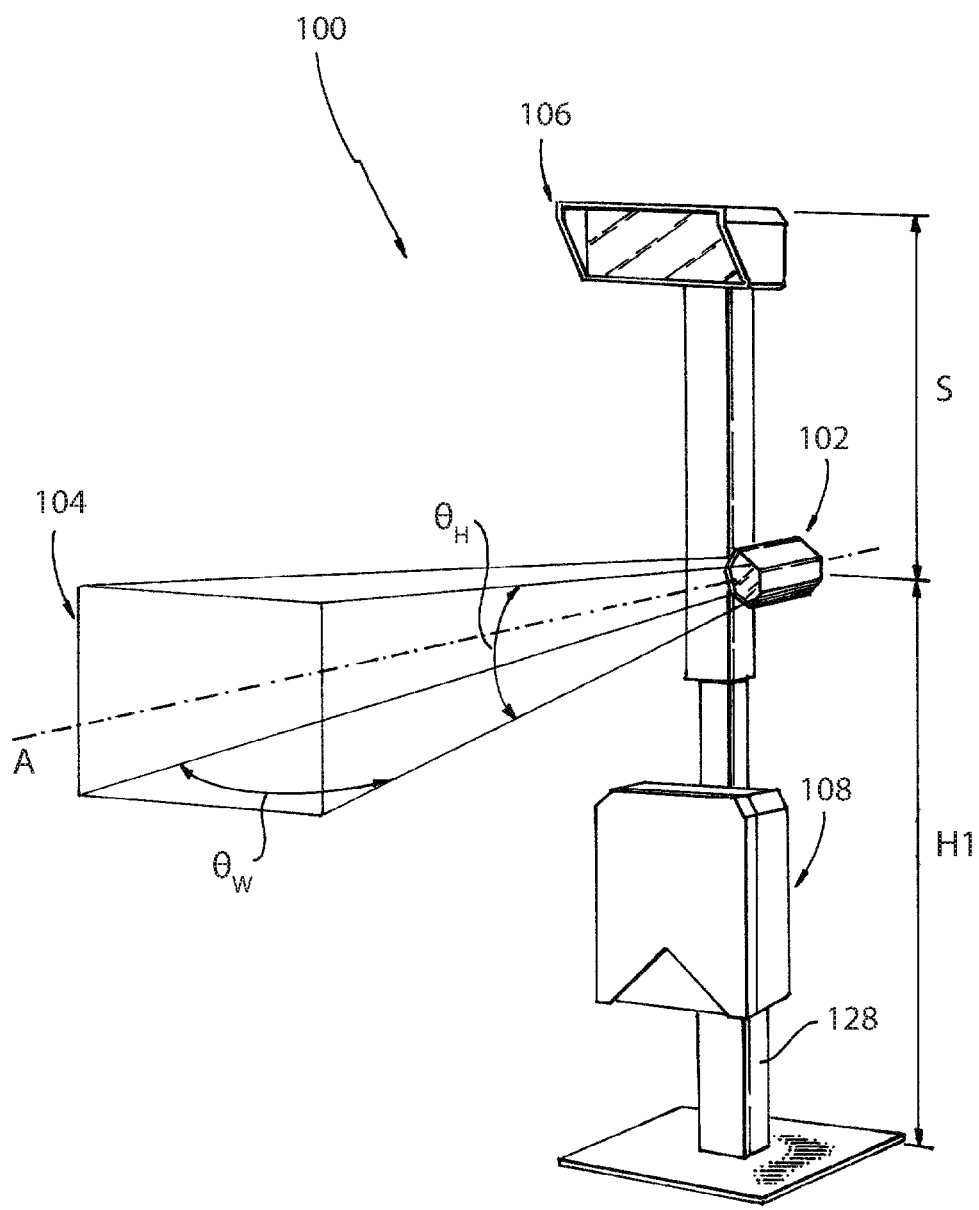
FIG. 1 is a perspective view of an embodiment of a system constructed in accordance with the present disclosure, showing a main pole with a first camera and a first illuminator.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to provide facial detection, license plate reading, vehicle overview, and vehicle model, make, and color detection all from a single image or exposure of a given vehicle.

Figure 2:
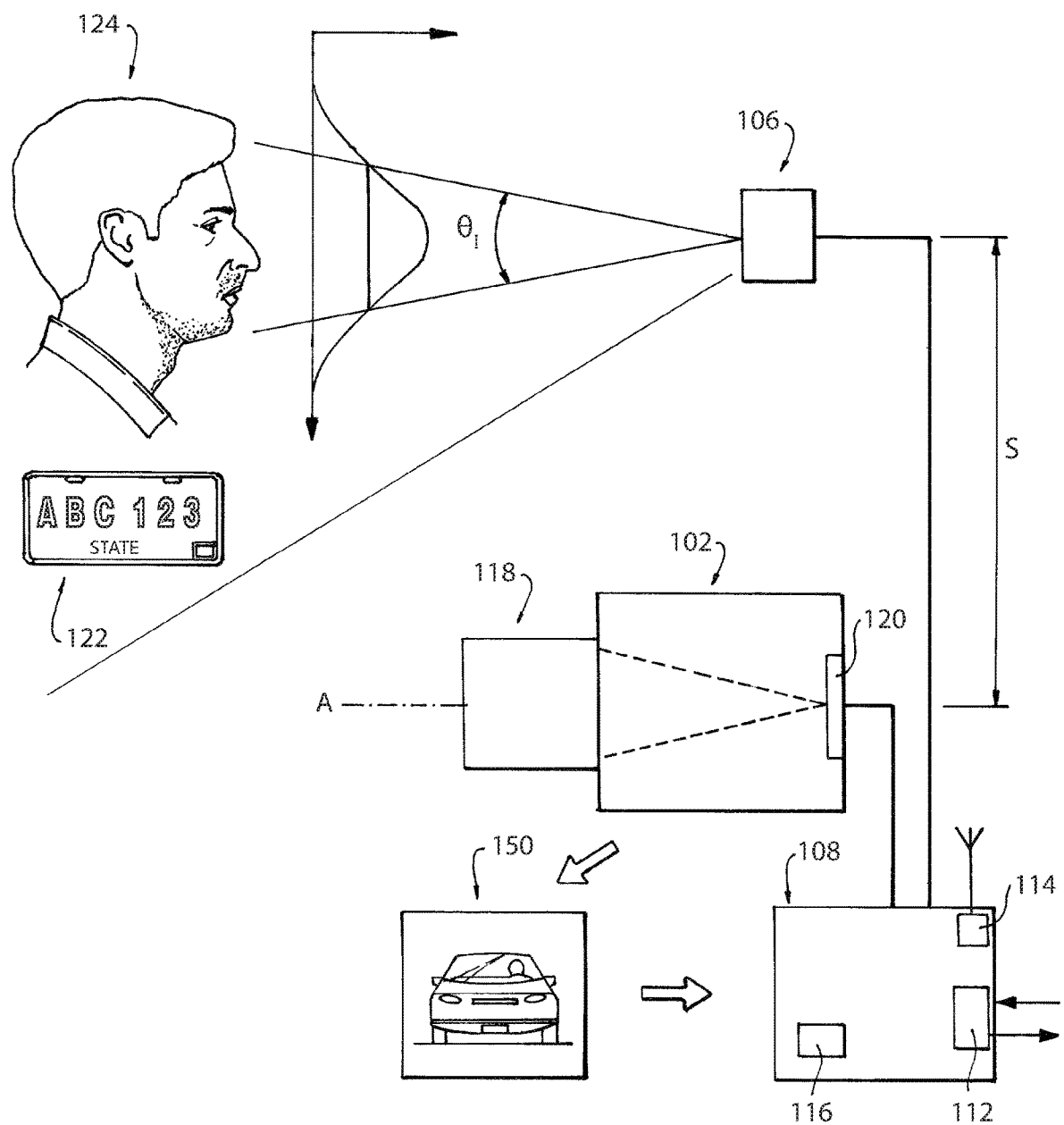
FIG. 2 is a schematic view of a portion of the system of FIG. 1, showing the sensor and optics of the first camera.

The system 100 includes a camera 102 defining an optical axis A and a field of view 104 defined about the optical axis A. An illuminator 106 is mounted offset from the optical axis A and directed to illuminate at least a portion of the field of view 104. The illuminator is operatively connected to the camera 102, e.g., directly or by way of an image processor 108 as shown in FIG. 2, to provide illumination during an image capturing exposure of the camera 102. An image processer 108 is operatively connected to the camera 102 and includes machine readable instructions 116 configured to receive image data from the camera 102 representative of an image 150 (shown in FIG. 2) captured with the camera 102, perform facial detection to detect at least one face in a vehicle 110 (labeled in FIGS. 5 and 6) in the image 150, perform license plate detection to detect at least one license plate on the vehicle 110 in the image 150, to provide a vehicle overview image of the vehicle 110, and to detect make, model, and color of the vehicle 110 detected in the image 150.

With reference now to FIG. 2, the machine readable instructions 116 can be configured to cause the imaging processor 108 to output, e.g. via connectivity interface 112 of the imaging processor 108, facial detection data for use in facial recognition, to perform license plate reading and to output a license plate number, region, state, country, and/or color of license plate, and to identify and make, model, color, year, and/or type (class) of a vehicle detected in the image 150 and output the same. The model name of the vehicle 110 can be localized (e.g. where a vehicle maker uses different names for the same model in one country verses another country) based on at least one of geography detected in license plate detection and/or geographical location of the camera 102. A global positioning sensor (GPS) 114 can optionally be operatively connected to the image processor 108, wherein the machine readable instructions 116 are configured to output model name of the vehicle 110 based on location data from the global positioning sensor 114. For example, the GPS location or geography detected from the license plate 122 itself could be used to select the correct analytical engine for determining the correct, localized model name. Other ways to determine location, such as an IP address location, or simply inputting or hard coding the location of the camera 102 into the imaging processor 108 can also be used for localization of items such as model name.

With continued reference to FIG. 2, the camera 102 includes optics 118 optically coupled to a sensor 120. The combined optics 118 and sensor 120 can be configured to provide at least 5 megapixels of image data at 280 pixels per foot (280 pixels per 30.5 cm), e.g., at a nominal range of 15 feet (4.6 meters), noting that pixels per foot can vary within an image based on the distance from camera of the various surfaces in the image, which can provide adequate image detail for both a front license plate 122 as well as for facial detection of passengers 124 in the vehicle 110. The optics 118 and sensor 120 can be configured to provide a field of view angle of $\theta_W$=32.5° by $\theta_H$=27.5° (width by height as labeled schematically in FIG. 1) for imaging vehicles at a distance D (measured in a direction parallel to the lane 136) of 15 feet (4.6 meters), as labeled in FIG. 5. The optics 118 and sensor 120 can be configured to provide a field of view angle of $\theta_W$=24.5° by $\theta_H$=20.5° (width by height) for imaging vehicles at a distance D of 20 feet (6.1 meters). The optics 118 can include a zoom lens that includes the field of view angles described above for 15 feet (4.6 meters) and for 20 feet (6.1 meters) while providing 280 pixels per foot detail at either distance. The sensor 120 can be configured for sensitivity in at least one of visible and/or near infrared (NIR).

With continued reference to FIG. 2, the illuminator 106 is separated from the optical axis A of the camera 102 by a standoff distance S configured to avoid overexposure of retroreflective license plate paint of the license plate 122 of the vehicle 110 (shown in FIG. 5). The standoff distance S can be two feet (61 cm), for example, wherein the optical axis A is angled to capture license plate images wherein the license plates 122 are between 15 to 20 feet (4.6 meters to 6.1 meters), inclusive, away from the camera 102. This standoff distance can be varied from application to application or from installation to installation, noting that traditional license plate retro reflectance drops off at angles larger than 7°. The distance D (labeled in FIG. 5) being in the range of 15 to 17 feet, and the standoff distance S being 2 feet, allows for the camera 102 to be outside of the 7° retroreflectance cone of the license plate 122 under the illumination of the illuminator 106.

The camera 102 and illuminator 106 can be configured to properly expose faces 124 even through vehicle glass, retroreflective license plates 122, and body features of the vehicle 110 all in a single exposure regardless of whether the exposure occurs under noon-day sun or dark night conditions. The camera 102 can be programmed to expose for image capture using f/1.2 aperture setting, and a nominal 200 microsecond shutter speed day or night. The exposure settings can be varied with the principle that during the day there is a need to provide enough flash illumination to provide facial images through the windshield without other aspects of the image being saturated. It can be advantageous to shorten the exposure time as much as possible to eliminate the impact of the sun while strobing the illuminator 106 enough that it dominates the signal level in the scene for both day and night imagery. It is possible to implement an autogain control to modify the exposure to acquire the best scene info possible based on the environment. The nominal exposure time of 200 microseconds can be varied based on sensor input.

The illuminator 106 can be configured to illuminate at 10° full width at half maximum (FWHM) in a Gaussian distribution (schematically indicated in FIG. 2) to illuminate faces 124 inside a vehicle 110 with relatively intense illumination and at the same time illuminate retroreflective license plate 123 of the vehicle 110 with relatively reduced illumination as indicated in FIG. 2 by the positioning of the illumination beam 126 relative to the face 124 and license plate 122. It should be noted that while reducing retroreflectance as disclosed herein, system 100 not only avoids saturation of retroreflective license plates, but also allows for retroreflective and non-retroreflective license plates to produce similar signal levels in the sensor 120 for successfully imaging both types of plates.

With reference now to FIGS. 5 and 6, the system 100 can include a plurality of cameras and illuminators. Camera 102 and illuminator 106 are mounted to a main pole 128 facing oncoming traffic. Three side poles 130 can be included for additional facial detection imagery. As shown in FIG. 3, each side pole 130 includes a side pole mounted camera 132 and side pole mounted illuminator 134. As shown in FIG. 5, the main pole 128 and side poles 130 can be arranged with the main pole 128 and one of the side poles 130 on a common side of a lane 136 of the oncoming traffic, and two of the side poles 130 can be on the opposite side of the lane 136.

With reference now to FIG. 6, a rear pole 138 is positioned on an opposite side of a ground loop trigger point 140 from the main pole 128 for imaging rear license plates 122. The plurality of cameras can include a rear camera 142, and the plurality of illuminators can include a rear illuminator 144. The rear camera 142 and rear illuminator 144 are mounted to a rear pole 138 separated from one another by a standoff distance B that can nominally be 3 feet (91.4 cm), which can vary based on the same need described above to have the camera 144 be outside of a 7° retroreflectance cone, to allow imaging the whole rear view of the vehicle 110 without saturating a retroreflective rear license plate.

Given the number flashes produced by the illuminators 106, 134, and 144 as a vehicle 110 travels along the lane 136, the image processor 108 (labeled in FIG. 1) is configured to control timing of the cameras 106, 132, 142 and illuminators 106, 134, 144 so that each camera only receives illumination from its respective illuminator, e.g., so the first camera 102 exposes for image capture only under illumination from the first illuminator 106 and so forth. This prevents shadows formed by one camera's illuminator degrading an image capture from a different one of the cameras.

With continued reference to FIGS. 5-6, the positioning of the cameras 106, 132, 142 and illuminators 106, 134, 144 can be as follows. The main pole 128 can be positioned a distance X1 from the lane 136, where X1 is 0.3 m, for example. One of the side poles 130 can be positioned the same distance D from the ground loop trigger 140 as the main pole 128, but on the opposite side of the lane 136, and also spaced apart by the distance X1 from the lane 136. The second side pole 130 can be positioned a distance of X2 (e.g. 1 meter) from the main pole 128 along a line angled 45° relative to the lane 136, and positioned closer to the ground look trigger than the main pole 128. The position of the third side pole 130 can be the same as for the second side pole 130, but mirrored across the lane 136. The lane 136 can itself have a width W of 3.2 meters. The rear pole 138 can be positioned on the same side of the lane 136 as the main pole 128 (or optionally on the opposite side of the lane 136), but on the opposite side of the ground loop trigger 140 from the main pole 128. The rear pole 138 can be spaced apart from the lane 136 by a distance of X4, e.g., 0.3 meters, and can be spaced apart from the ground loop trigger 130 by a distance of X3, e.g. 4 meters in the direction of the lane 136.

The heights H1, H2, H3 of the cameras 102, 132, and 142 can all nominally be 4 feet (1.2 meters), however H1, H2, and H3 do not all need to be the same as they are set up with the correct geometry to image the intended occupant while avoiding occlusions created by objects in the vehicle 110. FIGS. 5-6 show nominal distances, which can be varied from install to install as needed based on the principles disclosed herein.

The main pole 128 allows for a single exposure of a vehicle 110 to be used to obtain facial detection data, license plate reading data, vehicle overview data, and vehicle make, model, and color data. The additional poles 130, 138 and their respective cameras 132, 142 and illuminators 134, 144 can optionally be included to provide additional facial detection images and license plate reading images for the same vehicle 110. As shown FIG. 2, the imaging processor 108 can include a connectivity interface 112 configured to allow remote activation and deactivation of facial detection services, license plate reading services, vehicle overview services, and/or vehicle make, model, and color services, and can be used for transmitting facial detection data for use in facial recognition, license plate data for use in license plate identification, and vehicle overview data for use in make, model, and color identification.

The methods and systems of the present disclosure, as described above and shown in the drawings, provide for facial detection, license plate reading, vehicle overview, and vehicle model, make, and color detection all from a single image or exposure of a given vehicle. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a camera defining an optical axis and a field of view defined about the optical axis;
   an illuminator mounted offset from the optical axis and directed to illuminate at least a portion of the field of view, wherein the illuminator is operatively connected to the camera to provide illumination during an image capturing exposure of the camera; and
   an image processer operatively connected to the camera and including machine readable instructions configured to:
   receive image data representative of an image captured with the camera, perform facial detection to detect at least one face in the image, perform license plate detection/decoding for at least one license plate in the image, and to provide a vehicle overview image, wherein the illuminator is configured to illuminate at 10° full width at half maximum (FWHM) to illuminate faces inside a vehicle with relatively intense illumination and at the same time illuminate retroreflective license plate of the vehicle with relatively reduced illumination.

2. The system as recited in claim 1, wherein the machine readable instructions are configured to output facial detection data for use in facial recognition.

3. The system as recited in claim 1, wherein the machine readable instructions are configured to perform license plate reading and to output at least one of a license plate number, region, state, country, and/or color of license plate.

4. The system as recited in claim 1, wherein the machine readable instructions are configured to identify make, model, color, year and/or type (class) of a vehicle detected in the image.

5. The system as recited in claim 4, wherein the machine readable instructions are configured to output vehicle make, model, and color, wherein the model name is localized based on at least one of geography detected in license plate detection and/or geographical location of the camera.

6. The system as recited in claim 5, further comprising a global positioning sensor operatively connected to the image processor, wherein the machine readable instructions are configured to output model name based on location data from the global positioning sensor.

7. The system as recited in claim 1, wherein the camera includes optics optically coupled to a sensor, wherein the combined optics and sensor are configured to provide at least 5 megapixels of image data at 280 pixels per foot (30.5 cm).

8. The system as recited in claim 7, wherein the optics and sensor are configured to provide a field of view angle of 32.5° by 27.5° (width by height) for imaging vehicles at a distance of 15 feet (4.6 meters).

9. The system as recited in claim 7, wherein the optics and sensor are configured to provide a field of view angle of 24.5° by 20.5° (width by height) for imaging vehicles at a distance of 20 feet (6.1 meters).

10. The system as recited in claim 7, wherein the sensor is configured for sensitivity in at least one of visible and/or near infrared (NIR).

11. The system as recited in claim 1, wherein the illuminator is separated from the optical axis by a standoff distance configured to avoid overexposure of retroreflective license plate paint.

12. The system as recited in claim 11, wherein the standoff distance is two feet (61 cm) and wherein the optical axis is angled to capture license plate images wherein the license plates are between 15 to 20 feet (4.6 meters to 6.1 meters), inclusive, away from the camera.

13. The system as recited in claim 1, wherein the camera and illuminator are configured to properly expose faces through vehicle glass, retroreflective license plates, and vehicle body features all in a single exposure regardless of whether the exposure occurs under noon-day sun or dark night conditions.

14. The system as recited in claim 1, wherein the camera is programmed to expose for image capture using an f/1.2 aperture setting, and a 200 microsecond shutter speed day or night.

15. The system as recited in claim 1, wherein the camera is a first camera of a plurality of cameras, wherein the illuminator is a first illuminator of a plurality of illuminators, and wherein the image processor is configured to control timing of the cameras and illuminators so the first camera exposes for image capture only under illumination from the first illuminator.

16. The system as recited in claim 15, wherein the first camera and the first illuminator are mounted to a main pole positioned to face oncoming traffic.

17. The system as recited in claim 16, wherein the plurality of cameras includes three side pole mounted cameras, one on a common side of a lane of the oncoming traffic with the main pole, and two on an opposite side of the lane.

18. The system as recited in claim 16, wherein the plurality of cameras includes a rear camera, wherein the plurality of illuminators includes a rear illuminator, and wherein the rear camera and rear illuminator are mounted to a rear pole positioned on an opposite side of a ground loop trigger point from the main pole for imaging rear license plates.

19. The system as recited in claim 1, wherein the imaging processor includes a connectivity interface configured to allow remote activation and deactivation of facial detection services, license plate reading services, vehicle overview services, and/or vehicle make, model, and color services without needing to change any camera hardware.

* * * * *